Sept. 18, 1956 P. T. JOHNSON 2,763,101
PORTABLE LAWN MOWER GRINDER ASSEMBLY
Filed Feb. 10, 1956 2 Sheets-Sheet 1

INVENTOR.
PHILIP T. JOHNSON
BY
McMorrow, Berman & Davidson
ATTORNEYS

Sept. 18, 1956 P. T. JOHNSON 2,763,101
PORTABLE LAWN MOWER GRINDER ASSEMBLY
Filed Feb. 10, 1956 2 Sheets-Sheet 2

INVENTOR.
PHILIP T. JOHNSON
BY
McMorrow, Berman & Davidson
ATTORNEYS

United States Patent Office 2,763,101
Patented Sept. 18, 1956

2,763,101

PORTABLE LAWN MOWER GRINDER ASSEMBLY

Philip T. Johnson, Grover City, Calif.

Application February 10, 1956, Serial No. 564,713

2 Claims. (Cl. 51—48)

This invention relates generally to lawn mower sharpening apparatus and is more particularly concerned with a portable lawn mower grinder assembly for sharpening the reel blade elements of a reel-type lawn mower having a fixed transverse cutter bar.

Reel-type lawn mowers generally incorporate a transverse fixed cutter bar having a fixed cutting edge cooperating with a rotary cutting reel having a plurality of helically disposed transverse cutting blade elements having a cutting edge portion engageable in an angular shearing relationship with the fixed cutting edge of the cutter bar. In lawn mowers of the character involved, due to constant use, striking foreign objects, etc., the cutting edges of the reel blade elements and cutter bar require relatively constant maintenance in order to obtain efficient operation, thus requiring re-sharpening which necessitates long periods of non-use of the mower, a relatively high expense, and generally requiring a complex apparatus for properly orienting the cutting edges to be sharpened since the cutting edges of the blade elements of the reel should be sharpened in their oriented relationship relative to the cutting edge of the cutter bar with which they cooperate.

A primary object of invention in conformance with that set forth is to overcome the shortcomings of the prior art devices, providing a portable lawn mower grinder assembly for reel-type lawn mowers including a support frame securable on the reel supporting stub shaft axles of a reel-type lawn mower chassis, said frame providing a transverse track or guide portion supporting a reciprocable grinding assembly which includes a support member having journaled thereon a rotary grinder wheel engageable with the cutting edge of the blade elements of the lawn mower reel, said support member including thereon guide means for orienting the cutting edge of the blade elements of the reel in a position wherein the hollow ground cutting edge is provided on the blade elements of the reel in a proper oriented position relative to the cutting edge of the transverse cutter bar of the lawn mower being sharpened.

A further object of invention in conformance with that set forth is to provide a grinder assembly of the character set forth which includes means engageable with the lawn mower reel blade element permitting the rotary grinder wheel to uniformly provide a hollow ground cutting edge on the blade element when passing transversely across said blade element, and further including means engageable with the fixed cutter bar for properly orienting the cutting edge of the reel blade elements relative to the cutting edge of the cutter bar.

A further object of invention in conformance with that set forth is to provide a reel-type lawn mower grinder assembly of the character set forth which is readily and economically manufactured, easily used and maintained, and highly practical, serviceable and efficient for the purpose intended.

These together with other objects and advantages which will become subsequently apparent reside in the details of construction and operation as more fully hereinafter described and claimed, reference being had to the accompanying drawings forming a part hereof wherein like numerals refer to like parts throughout, and in which:

Figures 1, 2:
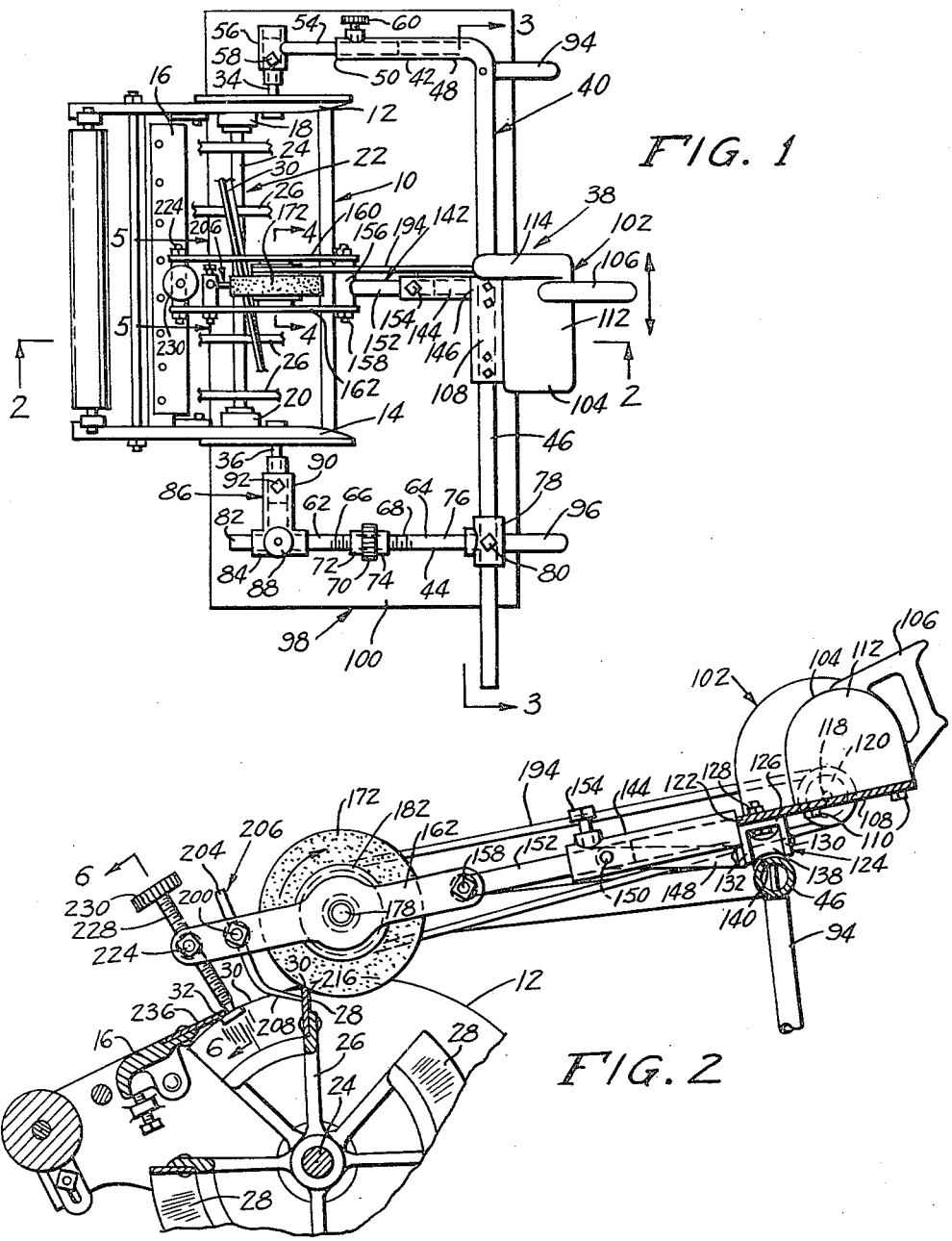
Figure 1 is a top plan view of the novel portable lawn mower grinder assembly as applied on a lawn mower having reel blade elements being sharpened, with portions of the reel blade elements broken away for clarity.
Figure 2 is a fragmentary enlarged sectional view taken substantially on line 2—2 of Figure 1.

Referring to the drawings in detail, a lawn mower frame or chassis is indicated generally at 10 and includes side frame members 12 and 14 having extending transversely therebetween and secured in a conventional manner a suitable transverse cutter bar 16, and extending from oppositely disposed aligned journaled portions 18 and 20 on the side frame members 12 and 14, respectively, is a transverse cutter reel assembly indicated generally at 22 said reel assembly including a central support shaft 24 including thereon in spaced relationship support spider elements or members 26 which carry thereon reel blade elements 28, the cutting edge 30 thereof being helically disposed relative to the transverse support shaft 24 thereof, the cutting edges approaching the cutting edge 32 of the fixed cutter bar 16 in an angular relationship relative thereto for defining a shear action on material being cut therebetween. Besides support members 12 and 14, the lawn mower frame has extending laterally therefrom in aligned relationship stub axle elements 34 and 36, respectively, which normally have journaled thereon the conventional lawn mower wheels of the mower which as seen in Figure 1 have been removed for accommodating the novel portable lawn mower grinder assembly indicated generally at 38.

The lawn mower grinder assembly 38 comprises a U-shaped support frame 40 which includes oppositely disposed leg portions 42 and 44 and a transverse bight or guide rail element portion 46. The support frame 40 is indicated as being constructed from tubular members, however any suitable members may be incorporated for this purpose, the material utilized therein being aluminum, for example, for the purpose of weight economy. However, the transverse bight or guide rail portion 46 may be made from a tubular steel in order to provide increased wear qualities which are necessary as subsequently will become apparent. The guide rail portion 46 includes a tubular end portion 48 comprising a portion of the leg member 42, and receives in the end 50 thereof an extensible leg or rod element 52 having integrally secured on the terminal end thereof a transverse tubular journal element 56 which accommodates therein the stub shaft 34 of the lawn mower frame. A suitable lock screw 58 extends transversely through the tubular journal sleeve 56 and is engageable with the stub shaft 34 for positively retaining one side of the support frame of the grinder assembly on the lawn mower frame. Extending transversely through the tubular portion 48 comprising a portion of the leg member, is a hand manipulable lock screw 60 for retaining the rod 54 in various positions of longitudinal adjustment in the tubular sleeve 48. This adjustment permits the accommodation of various sized lawn mower chassis on the grinder assembly.

The leg member 44 includes a pair of rod members 62 and 64 which are disposed in longitudinal alignment having adjacent end portions 66 and 68 oppositely threaded and accommodating thereon a hand manipulable turnbuckle or coupling element 70 which has oppositely threaded end socket portions 72 and 774 accommodated on the ends 66 and 68 of the rods 62 and 64, respectively, thus affording a longitudinal adjustment of the leg member 44. This adjustment also accommodates for various sized lawn mowers and provides a fine adjustment for obtaining a true parallel alignment between the bight rail portion 46 of the support frame 38 and the transverse cutter bar 16 of the lawn mower. The rod element 64 incorporates on the end 76 thereof a transverse T-shaped element 78 slidably received on the guide rail element 46 and extending through the T-shaped element 78 is a transverse lock screw 80 engageable with an underlying portion of the guide rail 46, this adjustment accommodating for various width lawn mower frames.

The end 82 of the rod 62 is slidably received in a tubular sleeve portion 84 of a T-shaped mounting element indicated generally at 86, the portion 84 having extending transversely therethrough a hand manipulable lock screw element 88 which is engageable with an underlying portion of the rod element 62 also providing a means for adjustment. Extending laterally from the portion 84 of the mounting element 86 is a lateral sleeve 90 which has extending transversely therethrough a suitable lock screw 92 engageable with an underlying portion of the stub shaft 36 also providing means for rigidly attaching the support frame 38 of the grinder assembly to the lawn mower frame. Extending in spaced relationship from lower intermediate portions of the bight or guide track portion 46 are depending support leg members 94 and 96 which may be of any convenient length, for example, a length sufficient to dispose the guide rail or bight portion 46 adjacent the waist of the user. It will be noted in Figure 2, that the legs extend angularly toward the operator of the grinder assembly, and if convenient may be disposed rearwardly of the leg members 42 and 44 of the support 38.

A suitable support stand 98 including a horizontal top member 100 may be provided for supporting on its upper surface the lawn mower chassis or frame as clearly seen in Figure 1.

The grinder assembly 38 includes a power grinding assembly indicated generally at 102 which is reciprocably supported on the guide track 46 and including the power source which has a suitably housed electric motor 104 having a laterally extending handle portion 106 for aiding in manipulation of the device. The motor 104 includes a lower mounting plate portion 108, see Figures 1 and 2, suitably secured by means of mounting bolts 110, for example, to a lower portion of the motor housing 112. The housing 112 includes an enlarged side portion 114, see Figure 3, for example, including a lower slot portion 116 having a transverse shaft 118 journaled thereacross which supports a drive pulley 120 driven by the electric motor, for example, contained within the housing 112.

Figure 3:
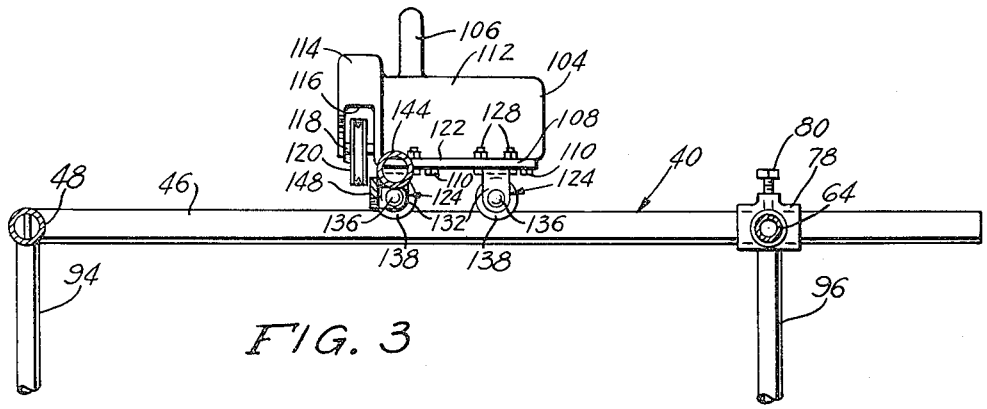
Figure 3 is an enlarged fragmentary sectional view taken substantially on line 3—3 of Figure 1.

Suitably secured adjacent the edge portion 122 of the plate 108 are a pair of transversely spaced downwardly opening inverted U-shaped journal bracket elements 124, see Figures 2 and 3, which include a web portion 126 suitably apertured to be disposed in alignment with suitable apertures through the plate 108 for accommodating therethrough suitable mounting bolt assemblies 128 for fixedly mounting the bracket elements 124 in depending relationship on the lower surface of the plate 108. The bracket elements 124 include flange or leg portions 130 and 132 having extending transversely therebetween in suitable aligned aperture portions a journal pin or axle element 136 for rotatably supporting suitable guide roller elements 138 which include a circumferential concave-groove 140, see Figure 2, having a radius of curvature conforming to that of the support rail 46.

Extending forwardly and away from the edge 122 of the plate 108 is an extensible support member indicated generally at 142, said support member including a tubular sleeve 144 integrally secured at its rear end 146 to the forward edge 122 of the plate 108. In order to afford additional rigidity to the tubular sleeve 144 a suitable brace element or strap 148 has one end suitably secured at 150 to a side portion of the sleeve 144, the other end of which being fixedly secured in any suitable manner to a side edge portion of the adjacent bracket element 124, see Figure 3. The support member 142 includes a shaft member 152 which is reciprocably received within the sleeve 144, said sleeve 144 having extending transversely therethrough a suitable lock screw 154 engageable with an underlying portion of the shaft 152 for retaining a predetermined adjusted position between the sleeve 144 and said shaft. The shaft 152 has integral therewith and extending transversely thereacross a tubular journal sleeve 156 which receives therein a suitable mounting bolt 158 having mounted thereon a pair of mutually parallel journal straps 160 and 162. The shaft 152 permits articulation about a horizontal pivot axis relative to the journal sleeve 156 for a purpose to subsequently become apparent.

Figure 4:
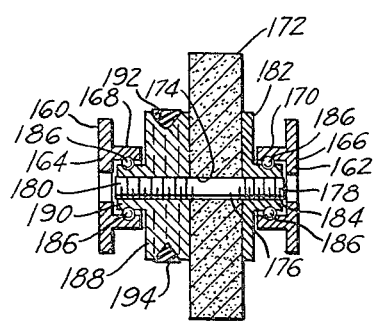
Figure 4 is a further enlarged fragmentary sectional view taken substantially on line 4—4 of Figure 1.

The support straps 160 and 162 include oppositely disposed intermediate enlarged portions 164 and 166, respectively, see Figure 4, which have integrally formed thereon annular bearing housing portions 168 and 170, respectively, see Figure 4. A circular grinding wheel of any suitable material is indicated at 172 and includes a central transverse bore portion 174 receiving therethrough a suitable support shaft 176 which includes opposite threaded end portions 178 and 180, the portion 178 receiving thereon an annular clamping disk 182 which terminates in a reduced diameter bearing support portion 184. The housing 170 includes on its inner periphery a suitable annular concave track which is positionable in overlying relationship to a similar annular track about the outer periphery of the portion 184, said track portions having disposed therein suitable bore ball bearing elements 186. The clamping plate 182 has an internally threaded transverse central bore portion engageable on the threads 178 for clamping one side of the grind wheel 172. Threadedly secured on the threaded portion 180 of the shaft 176 is a combined pulley and clamping plate 188 which has integrally formed thereon a reduced diameter bearing support portion 190, the bearing housing 168 and the bearing support portion 190 each including oppositely disposed annular grooved portions of a character similar to those described relative to the housing 170 and the reduced diameter portion 184 on the opposite side of the grind wheel, and supported therein are similar ball bearing elements 186. The element 188 includes an annular V-shaped groove exending about the outer periphery seen at 192 and will normally be disposed in planar alignment with the pulley 120 of the motor within the housing 112. A suitable drive belt 194 journaled about the outer periphery of the respective pulley members 120 and 188, rotates the grind wheel 172 as is clearly apparent. By virtue of the lock screw 154 and the extensible relationship between the tubular sleeve 144 and the shaft 152 there is provided means for applying a predetermined satisfactory tension on the drive belt 194.

Figure 5:
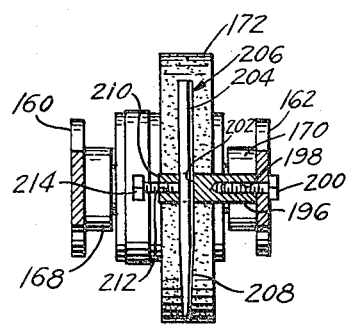
Figure 5 is a further enlarged fragmentary sectional view taken substantially on line 5—5 of Figure 1.

Extending laterally from an inner surface portion of the support strap 162 is a rod-like support element 196, see Figures 1 and 5, for example, which includes an internally threaded bore portion 198 for receiving therein a suitable fastening element such as a machine screw 200 which extends through a suitable transverse aperture in the intermediate portion of the support strap 162. Although the support element 196 is disclosed as being supported on the support strap 162 it could be readily supported on the support strap 160 for affording the identical function to subsequently be described. The support element 196 has extending transversely therethrough a bore portion 202 which reciprocably receives therein the body portion 204 of a guide finger element indicated generally at 206. The lower end portion of the guide finger element 206 is angulated at 208 and extends toward the outer periphery of the grind wheel 172 as clearly seen in Figure 2. Extending into the end 210 of the support element 196 is an internally threaded bore portion 212 which communicates with the transverse bore 202, said internally threaded bore portion 212 receiving therein a suitable lock screw element 214 which is engageable with the body portion 204 of the guide finger element. The support element 196 provides a horizontal support axis for the guide finger element 206 and the lock screw 214 permits transverse adjustment of said guide finger element. As clearly seen in Figure 2, the guide finger element portion 208 is engageable at 216 with a surface portion of the blade elements 28 of the mower cutting reel, and when the screws 200 and 214 are tightened provides a constant guide for obtaining a hollow ground cutting edge 30 on said reel blade elements. Inasmuch as the mower reel is freely rotatable on its shaft 24, as the motor grinder assembly 102 is moved along the guide rail 46, the reel being free to rotate, it will be uniformly ground on its cutting edge.

Figure 6:
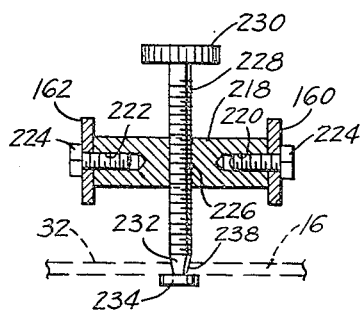
Figure 6 is a further enlarged fragmentary sectional view taken substantially on line 6—6 of Figure 2.

Extending transversely across suitable aligned apertured portions of the support straps 160 and 162 adjacent the terminal ends thereof, is a journal rod or support rod 218, see Figure 6, which includes in its opposite ends internally threaded bore portions 220 and 222 which are alignable in the previously-mentioned aligned apertures in the support straps 160 and 162 and receive therein suitable fastening screws 224. Extending transversely through a central portion of member 218 is an internally threaded bore portion 226 which receives therein a threaded shaft 228 which includes on its upper end a transverse handle portion 230 the lower end of which is tapered at 232 having secured thereon a transverse lug element 234. The adjustable shaft 228 in conjunction with the lug element 234 and the tapered lower end portion 232 thereof constitute fixed abutment means engageable with the transverse cutter bar 16 of the lawn mower, the lug element 234 being positionable beneath the blade 236 of said cutter bar thus cooperating with the tapered portion 232 to substantially form a retaining notch or groove 238 for fixedly positioning a grinder assembly relative to the transverse cutter bar. By virtue of the screws 224 which provide a horizontal pivot axis for the adjustable screw 228, and the transverse adjustable feature of said screw, the grinder assembly can be properly aligned relative to the cutting edge of the fixed cutter bar and also serves to retain the support member 142 in a relatively fixed oriented position, however, reciprocable movement as previously described may be obtained when such adjusted position is in effect.

Thus there has been provided a readily portable as well as efficient and expeditiously operated reel-type lawn mower sharpener grinder whereby a uniform sharpened cutting edge 30 may be obtained on the reel of the lawn mower.

Various positional directional terms such as "forward," "upper," etc., are utilized herein and have only a relative connotation to aid in describing the device and it is not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the appended claims.

What is claimed as new is as follows:

1. A portable lawn mower grinder assembly for reel-type lawn mowers including helical rotary cutting blades and a transverse cutter bar, comprising a U-shaped support frame member including a pair of leg members connected by a transverse bight member defining a guide track portion, connecting means on terminal ends of the leg members for connection to an end axle portion of the lawn mower, and a reciprocable power grinding assembly supported on the guide track element, said power grinding assembly comprising hand manipulable power means carried on the guide track portion, a support member extending from the power means between the leg members, a rotary grind wheel journaled on the support member on an axis of rotation parallel to the guide track portion for progressively grinding the cutting edge of the blade elements of the lawn mower cutting wheel, and adjustable guide means on the support member engageable with a portion of the lawn mower and blade elements of the cutter reel for uniformly grinding the reel blade elements, the leg members comprising adjustable extensible sections for adjusting the track portion relative to the lawn mower upon which the assembly is mounted and aligning said track portion in parallel relationship relative to the fixed cutter bar of the lawn mower, one of said leg members including intermediate adjusting means for obtaining a relatively fine adjustment in moving the extensible sections forward and away from each other.

2. A portable lawn mower grinder assembly for reel-type lawn mowers including helical rotary cutting blades and a transverse cutter bar, comprising a U-shaped support frame member including a pair of leg members connected by a transverse bight member defining a guide track portion, connecting means on terminal ends of the leg members for connection to an end axle portion of the lawn mower, and a reciprocable power grinding assembly supported on the guide track element, said power grinding assembly comprising hand manipulable power means carried on the guide track portion, a support member extending from the power means between the leg members, a rotary grind wheel journaled on the support member on an axis of rotation parallel to the guide track portion for progressively grinding the cutting edge of the blade elements of the lawn mower cutting reel, and adjustable guide means on the support member engageable with a portion of the lawn mower and blade elements of the cutter reel for uniformly grinding the reel blade elements, said adjustable guide means comprising a first horizontal pivot axis element on the support member, a transverse guide finger element adjustably supported on the pivot axis element, means on the pivot axis element permitting rotational adjustment of the finger element, said finger element including a terminal end portion engageable with the surface portion of a reel blade element, and a second horizontal pivot axis element on the support member in spaced relationship from the first horizontal pivot axis element, an adjustable guide element rotatably carried transversely of the second pivot axis element, said adjustable guide element including an abutment portion on the lower end thereof for engagement with the transverse cutter bar of the lawn mower for orienting the grinder assembly relative to said cutter bar, the leg members comprising adjustable extensible sections for adjusting the track portion relative to the lawn mower upon which the assembly is mounted and aligning said track portion in parallel relationship relative to the fixed cutter bar of the lawn mower, one of said leg members including intermediate adjusting means for obtaining a relatively fine adjustment in moving the extensible sections forward and away from each other.

References Cited in the file of this patent
UNITED STATES PATENTS
2,281,055   Smith _____ Apr. 28, 1942
2,572,530   Smith _____ Oct. 23, 1951